United States Patent
Mack

(10) Patent No.: US 7,479,711 B2
(45) Date of Patent: Jan. 20, 2009

(54) SYSTEM AND METHOD FOR CONTROLLING CYCLING OF A VEHICLE CONTACTOR

(75) Inventor: David Mack, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 114 days.

(21) Appl. No.: 11/551,790

(22) Filed: Oct. 23, 2006

(65) Prior Publication Data

US 2008/0093923 A1   Apr. 24, 2008

(51) Int. Cl.
  *H01H 27/00* (2006.01)
  *F02N 17/00* (2006.01)
  *B60R 21/00* (2006.01)
(52) U.S. Cl. ............. 307/10.3; 123/179.3; 180/270
(58) Field of Classification Search ......... 307/137, 307/139, 141, 10.3; 123/179.3; 180/270
  See application file for complete search history.

(56) References Cited

U.S. PATENT DOCUMENTS

| 4,901,690 A | 2/1990 | Cummins et al. |
| 5,970,938 A | 10/1999 | Hisamoto et al. |
| 6,011,317 A | 1/2000 | Vilou |
| 6,054,782 A | 4/2000 | Girard et al. |
| 6,609,488 B2 | 8/2003 | Nagae et al. |
| 6,708,429 B1 | 3/2004 | Vilou |
| 7,084,526 B2 * | 8/2006 | Bruwer .................. 307/87 |
| 2003/0205936 A1 * | 11/2003 | Beckerman et al. ........ 307/10.1 |

* cited by examiner

*Primary Examiner*—Michael J Sherry
*Assistant Examiner*—Michael Rutland Wallis
(74) *Attorney, Agent, or Firm*—David B. Kelley; Brooks Kushman P.C.

(57) ABSTRACT

A system and method for controlling cycling of high voltage contactors is provided. In one embodiment, the method includes generating a first contactor command and activating the contactor in response to the first contactor command. A timer is initiated upon generation of the first contactor command. The method also includes determining whether a second contactor command should be generated subsequent to the generation of the first contactor command. The method further includes activating the contactor in response to the second contactor command being generated when the timer has expired.

20 Claims, 5 Drawing Sheets

SYSTEM AND METHOD FOR CONTROLLING CYCLING OF A VEHICLE CONTACTOR

TECHNICAL FIELD

The present invention relates to a vehicle system and method for controlling the cycling of a vehicle contactor.

BACKGROUND

Vehicles, such as hybrid electric vehicles (HEV) utilize a high voltage battery in their architecture. The high voltage battery provides power to the vehicle via a high voltage bus. It is common for these high voltage batteries to utilize high voltage contactors that couple or decouple power to and from devices on the vehicle. When an ignition-on position is achieved, the contactors are commanded to a closed position to couple the high voltage battery to the vehicle devices. Conversely, upon an ignition-off position, the contactors decouple the vehicle devices from the high voltage battery. In conventional vehicles having a high voltage bus, rapid changes in the position of the ignition cause rapid opening and closing (i.e., cycling) of the contactors. It is commonly known that cycling of the contactors may result in overheating of the contactor components (e.g., precharge resistors, circuits, and the like), unnecessary contactor component wear, and noise vibration and harshness (NVH) anomalies.

The present invention was conceived in view of these and other disadvantages of conventional vehicle systems.

SUMMARY

The embodiments described herein provide a system and method for controlling cycling of high voltage contactors. The high voltage contactors are connected to a high voltage bus on a vehicle such as a hybrid electric vehicle (HEV). In one aspect of the invention, the method includes generating a first contactor command. The method also includes activating the contactor in response to the first contactor command being generated. The method further includes initiating a timer when the first contactor command has been generated, wherein the timer is set to expire once a predetermined cycle time has passed. The method includes determining whether a second contactor command should be generated subsequent to the generation of the first contactor command based on the timer. The method also includes generating the second contactor command when the timer expires. The method includes activating the contactor in response to the second contactor command being generated when the timer has expired.

BRIEF DESCRIPTION OF THE DRAWINGS

These and other features and advantages of the invention will be apparent from the following detailed description and the appendant claims, taken in conjunction with the accompanying drawings, in which:

DETAILED DESCRIPTION OF THE PREFERRED EMBODIMENT(S)

By way of example, a system and method for implementing the present invention is described below. The described system and method may be adapted, modified or rearranged to best-fit a particular implementation without departing from the scope of the present invention.

Figure 1:
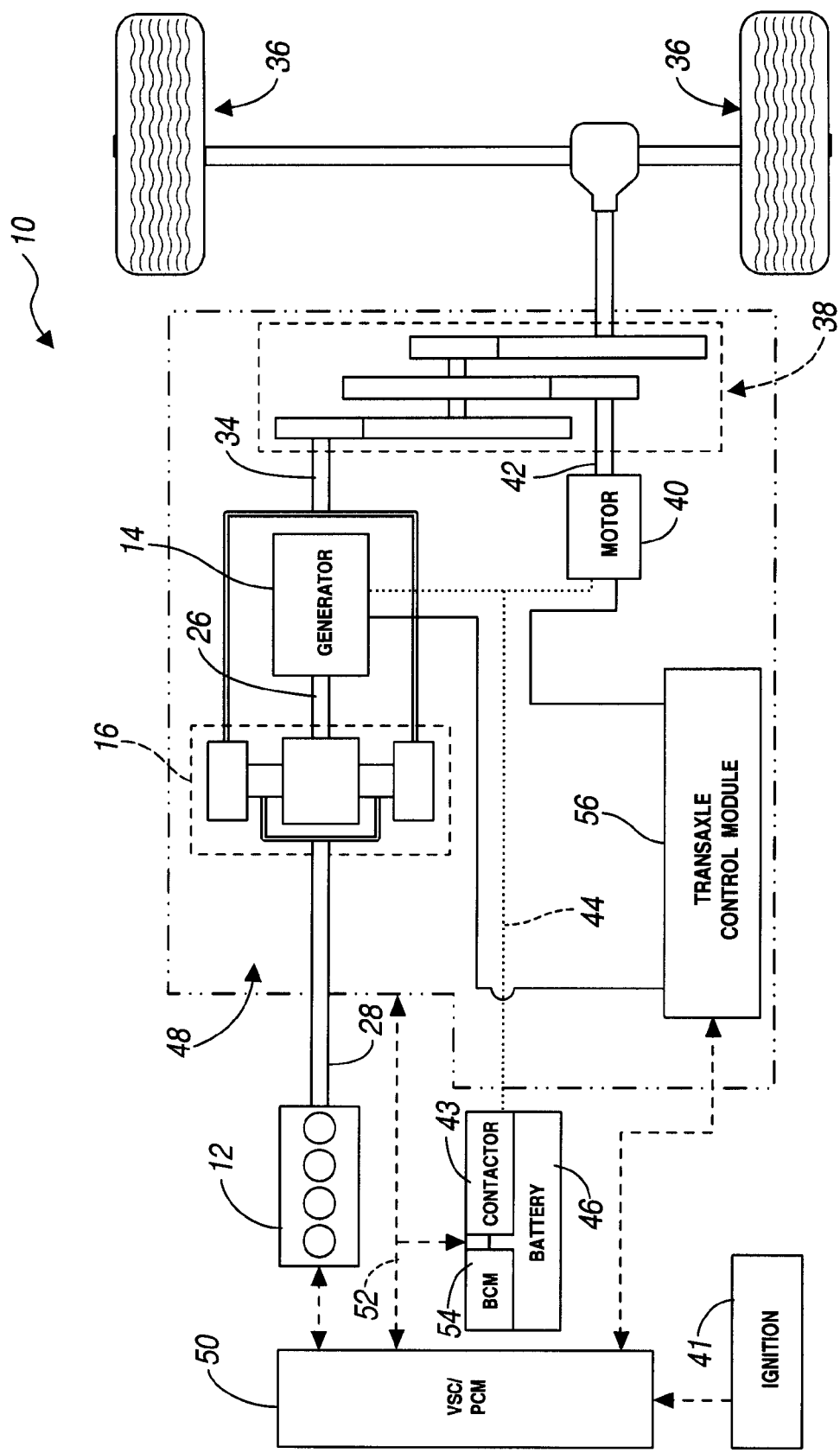
FIG. 1 is a schematic representation of an exemplary vehicle in accordance with an embodiment of the present invention.

FIG. 1 illustrates a schematic representation of a vehicle 10 in accordance with an embodiment of the present invention. The vehicle 10 includes an engine 12 and an electric machine, or generator 14. The engine 12 and the generator 14 are connected through a power transfer unit, which in this embodiment is a planetary gear set 16. Of course, other types of power transfer units, including other gear sets and transmissions, may be used to connect the engine 12 to the generator 14. The planetary gear set 16 is connected to a shaft 34, which is connected to vehicle drive wheels 36 (i.e., rear wheels) through a second gear set 38.

The generator 14 can also be used as a motor, outputting torque to a shaft 26. Similarly, the engine 12 outputs torque to a shaft 28, which is coupled to the generator 14. Having the generator 14 operatively connected to the engine 12, as shown in FIG. 1, allows the speed of the engine 12 to be controlled by the generator 14.

Vehicle 10 also includes a second electric machine, or motor 40, which can be used to output torque to a shaft 42. Other vehicles within the scope of the present invention may have different electric machine arrangements, such as more or less than two electric machines. In the embodiment shown in FIG. 1, the motor 40 and the generator 14 which constitute, in part, a regenerative braking system can both be used as motors to output torque to wheels 36.

As shown in FIG. 1, the motor 40, the generator 14, the planetary gear set 16, and a portion of the second gear set 38 may generally be referred to as a transaxle 48. The transaxle 48 is analogous to a transmission in a conventional vehicle. Thus, when a driver selects a particular gear, the transaxle 48 is appropriately controlled to provide that gear. To control the engine 12 and the components of the transaxle 48—e.g., the generator 14 and motor 40—a control system, including a controller 50, is provided. In addition, the transaxle 48 may include one or more controllers, such as a transaxle control module (TCM) 56, configured to control specific components within the transaxle 48, such as the generator 14 and/or the motor 40.

Furthermore, motor 40 and generator 14 can each output electrical power to a high voltage bus 44 and to an energy storage device, or battery 46. The battery 46 is a high voltage battery that is capable of outputting electrical power over bus 44 to operate the motor 40 and the generator 14. Other types of energy storage devices and/or output devices can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

An ignition 41 is configured to start the engine 12 by communicating with the controller 50. The ignition 41 has at least two positions: an ignition-on position and an ignition-off position. When in the ignition-on position, the controller 50 generates a control signal for the battery 46 to supply power over the bus 44 to the generator 14 and the motor 40. Alternatively, under certain conditions as will be described hereinafter, the ignition-off position causes the controller 50 to generate signals to de-couple the battery 46 from the bus 44.

As recognized by one of ordinary skill in the art, the ignition 41 may be configured to receive a key that enables positioning of the ignition. Alternative embodiments of the ignition 41 include, but are not limited to, push-button ignitions and ignitions configured to respond to a remote control or a fob.

As shown, the battery 46 also includes a battery control module (BCM) 54 and a contactor 43. The BCM 54 is configured to receive control signals from the controller 50. In response, the BCM 54 generates contactor commands for the contactor 43. The contactor 43 is a high voltage contactor that includes a high voltage switch coupled to electrical circuits. The switch may be embodied as a configuration of transistors, electrical switches, and the like. As such, the contactor 43 may be activated so as to be placed in a closed position or an open position. When in the closed position, the contactor 43 couples the battery 46 to the generator 14 and the motor 40 over the bus 44. Alternatively, when the contactor 43 is in the open position, the battery 46 is decoupled from the generator 14 and the motor 40. As will be described hereinafter, the rapid positioning of the contactor 43 from the closed position to the open position (also referred to as cycling) is controlled to reduced undesired hardware anomalies.

It is recognized that although the vehicle 10 is an HEV, it is understood that the present invention contemplates the use of other types of vehicles. In addition, although the vehicle 10 shown in FIG. 1 is a parallel-series HEV, the present invention is not limited to HEV's having such a "powersplit" configuration.

The controller 50 may be a combination vehicle system controller and powertrain control module (VSC/PCM). Although it is shown as a single hardware device, it may include multiple controllers in the form of multiple hardware devices, or multiple software controllers within one or more hardware devices. The controller 50 also includes a timer for tracking time associated with positioning of the ignition 41 and the generation of contactor commands for the contractor 43. Particularly, the timer is programmed to have a cycle time by which cycling of the contactor 43 is controlled. In one embodiment, the cycle period may be in a range of 0 seconds to 60 seconds. It is recognized that other ranges are applicable depending on operational requirements without departing from the scope of the present invention.

A controller area network (CAN) 52 allows the controller 50 to communicate with the transaxle 48 and the battery control module (BCM) 54. Just as the battery 46 has the BCM 54, other devices controlled by the controller 50 may have their own controllers. For example, an engine control unit (ECU) (not shown) may communicate with the controller 50 and may perform control functions on the engine 12.

Figure 2A:
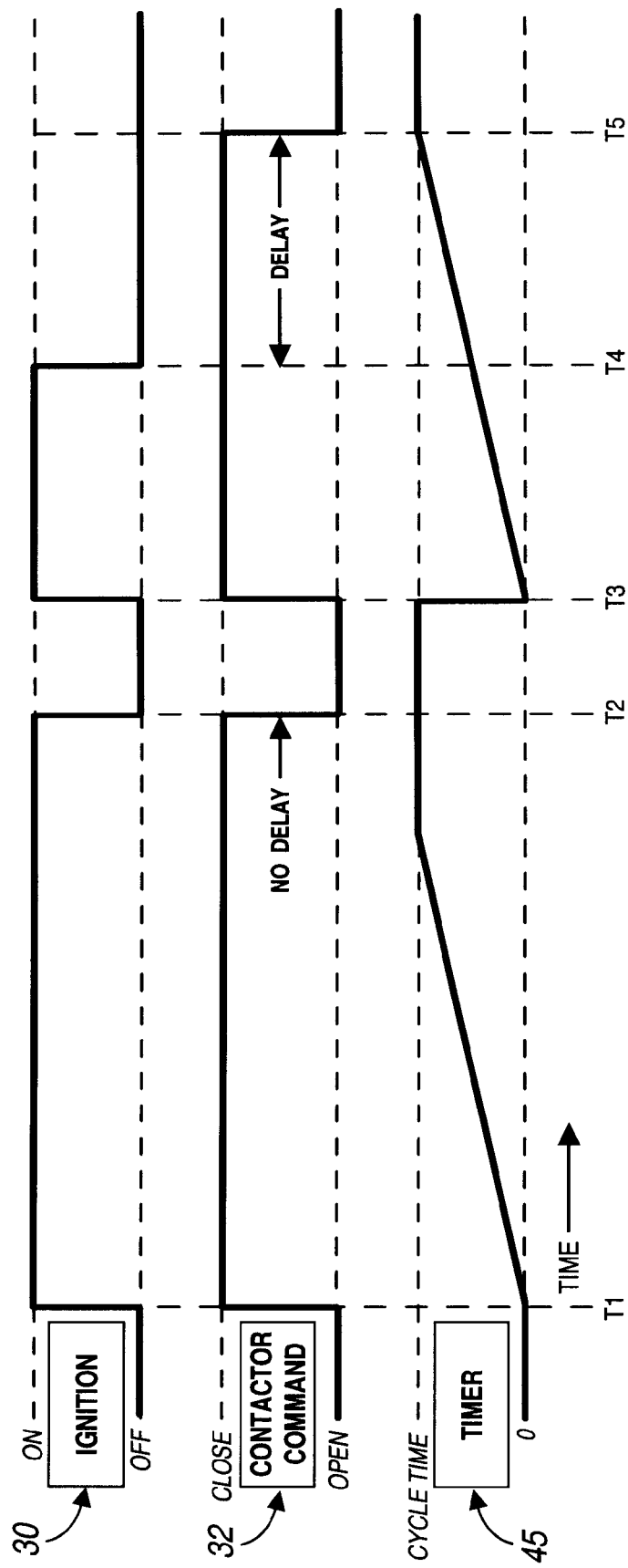
FIGS. 2A, 2B and 2C illustrate exemplary waveforms corresponding to an ignition position, a contactor command, and a timer in accordance with an embodiment of the present invention.
Figure 2B:
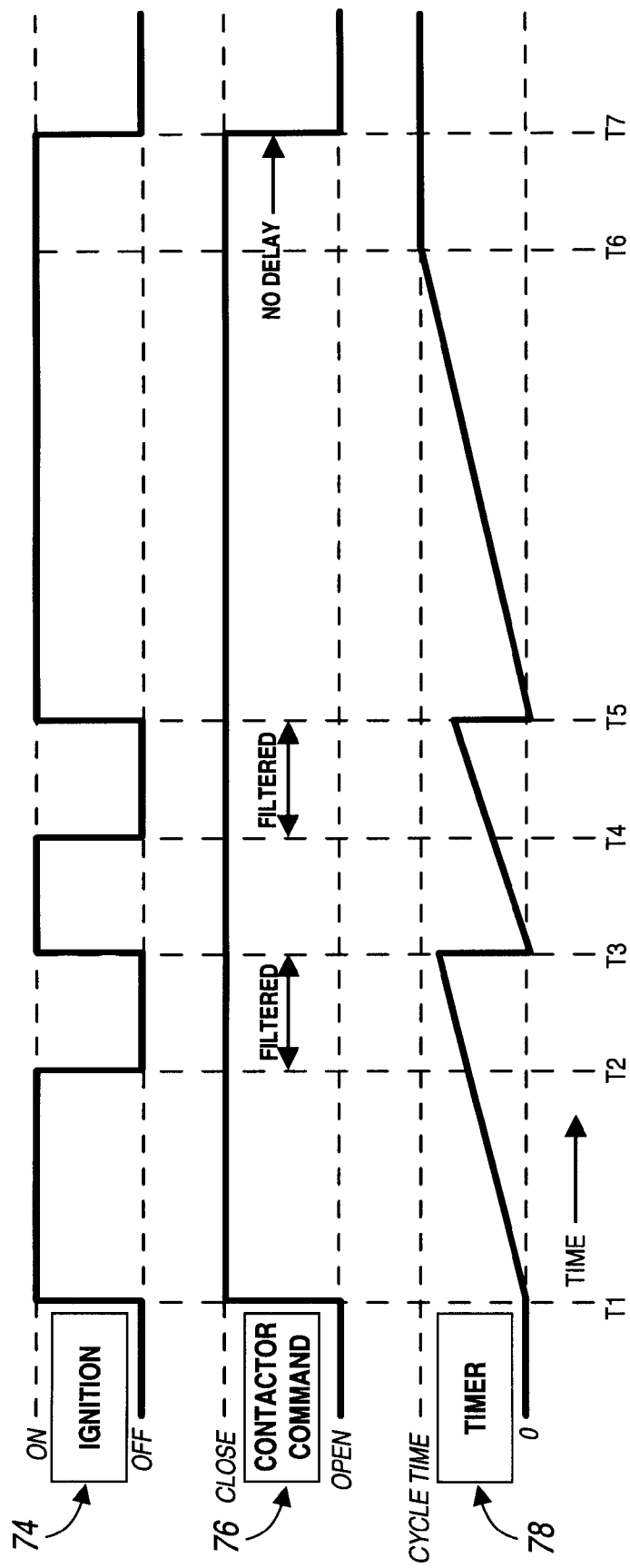
Figure 2C:
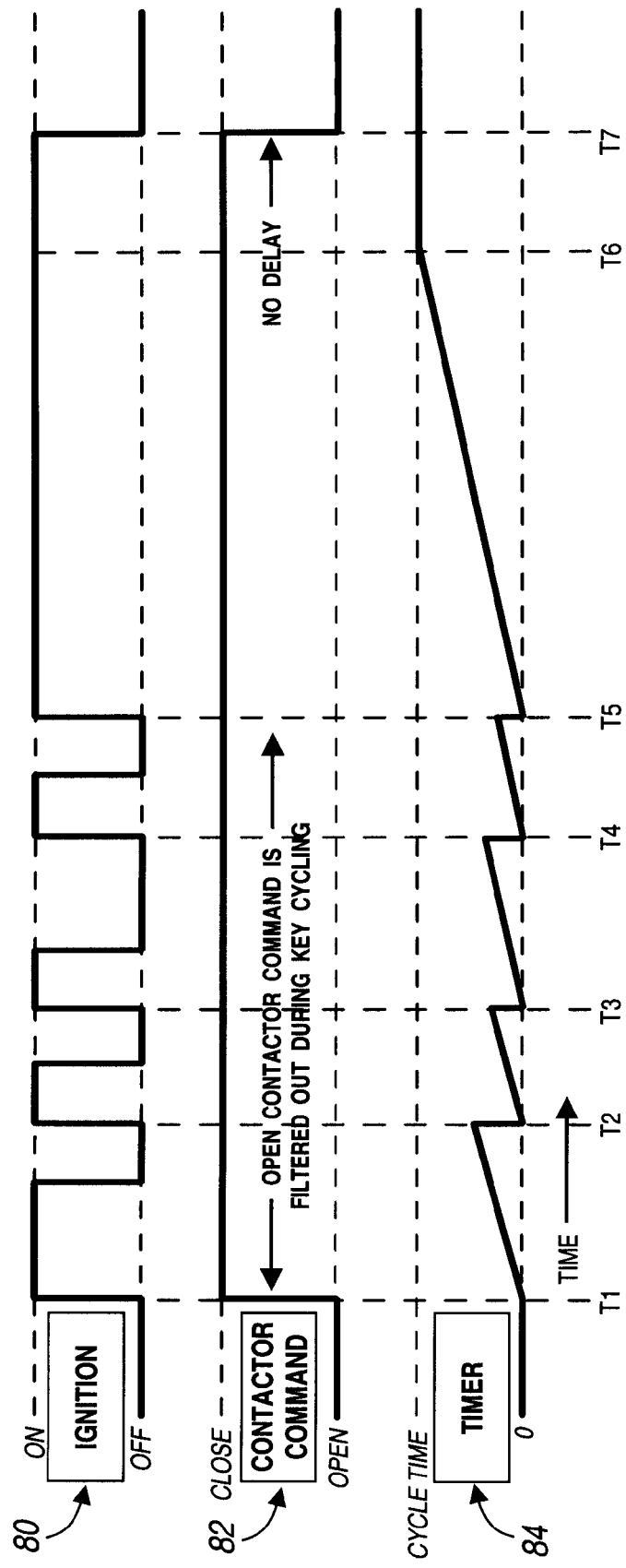

As described above, the controller 50 receives signals from the ignition 41 that correspond to the position of the ignition 41. In response, the controller 50 generates a control signal for the BCM 54. The BCM 54 will then generate the contactor command causing the contactor 43 to open or close. However, to control cycling of the contactor 43, once the contactor is activated, the activation of the contactor 43 in response to subsequent contactor commands may be delayed if the timer has not expired. Specifically, the controller 50 determines whether a subsequent contactor command should be generated based on the timer. As such, the controller 50 delays the generation of the control signals (for the BCM 54) when the cycle time of the timer has not passed or expired. FIGS. 2A-2C provide an illustration of how contactor commands are processed in accordance with the foregoing description, which is merely one embodiment of the present invention.

FIGS. 2A, 2B and 2C provide waveforms that correspond to an ignition position, a contactor command, and a timer. Specifically in FIG. 2A an ignition waveform 30, a contactor command waveform 32 and a timer waveform 45 is illustrated. At a time T1, the ignition transitions from the ignition-off position to the ignition-on position. Likewise, the contactor is activated and transitions from the open position to the closed position to allow the high voltage battery to supply power to the motor and generator over the high voltage bus.

Also, at T1, as shown by the timer waveform 45, the timer is initiated. The timer waveform 45 includes a cycle time, which is a minimum time at which certain subsequent contactor commands are processed to enable activation of the contactor. As shown between T1 and T2, the timer has expired (i.e., the minimum cycle time has been reached). Accordingly, at T2 as shown by the ignition waveform 30, the ignition transitions from the ignition-on to the ignition-off position. Accordingly, the contactor command is processed, which causes the contactor to transition from the closed position to the open position without delay, as shown by the contactor command waveform 32.

At T3, the ignition again transitions from the ignition-off position to the ignition-on position. Accordingly, the contactor transitions from the open position to the closed position and the timer is reinitiated. At T4, the ignition is returned to the ignition-off position. However, as shown in the timer waveform 45, the minimum cycle time has not been reached at T4. As such, the contactor command is not processed and remains in the closed position. Particularly, the controller 50 (FIG. 1) does not generate a control signal for the BCM 54 (FIG. 1) to cause the contactor to change positions. Although the contact command waveform 32 indicates that the contactor does not immediately transition from the closed position to the open position at T4, it is recognized that once the vehicle ignition is placed in the ignition-off position, the vehicle, without delay, is configured to remove torque from the wheels.

At T5, the minimum cycle time has been reached (i.e., the timer has expired) and the contactor command is processed. Accordingly, the contactor is activated so as to be in the open position. Thus, when the minimum cycle time has not been reached, the contactor command is delayed so as to minimize the undesirable effects of rapid contactor cycling. Delaying the contactor command results from the controller not generating the control signal for the BCM 54 to generate the contactor command.

Now, referring to FIG. 2B, an additional aspect of the present invention is shown. FIG. 2B also includes an ignition waveform 74, a contactor command waveform 76, and a timer waveform 78. At T1, the ignition is placed in the ignition-on position, the contactor command causes the contactor to be in the closed position and the timer is initiated. At T2, the ignition transitions to the ignition-off position. However, the minimum cycle time has not been reached, as indicated by the timer waveform 78. As such, the contactor command is filtered or delayed and the contactor remains in the closed position. At T3, the ignition transitions from the ignition-off position to the ignition-on position. The contactor remains in the closed position and the timer is reinitiated. At T4, the ignition transitions from the ignition-on position to the ignition-off position. As shown, the minimum cycle time has not been reached and the contactor remains in the closed position as the contactor command is filtered. At T5, the ignition transitions from the ignition-off position to the ignition-on position. The contactor remains in the closed position and the timer is reinitiated.

At T6, the cycle time is reached, as indicated by the timer waveform 78. At T7, the ignition transitions from the ignition-on position to the ignition-off position, subsequent to the expiration of the timer. Accordingly, the contactor command is processed without any delay or filtering and the contactor is activated so as to transition to the open position.

FIG. 2C illustrates yet another example wherein the cycling of a contactor is controlled in accordance with an embodiment of the present invention. FIG. 2C includes an ignition waveform 80, a contactor command waveform 82, and a timer waveform 84. At T1, the ignition transitions from the ignition-off position to the ignition-on position. Accordingly, the contactor command is processed and the contactor transitions from the open position to the closed position. The timer at T1 is also initiated, as indicated by the timer waveform 84. Between T1 and T2, the ignition transitions from the ignition-on position to the ignition-off position. However, the cycle time has not been reached and the contactor remains in the closed position. At T2, the ignition transitions from the ignition-off position to the ignition-on position. The contactor remains in the closed position and the timer is reinitiated. Between T2 and T3, the ignition transitions from the ignition-on position to the ignition-off position. However, the timer has not expired and the contactor remains in the closed position. At T3, the ignition is placed in the ignition-on position and the timer is reinitiated. Between T3 and T4, the ignition transitions from the ignition-on position to the ignition-off position. However, between T3 and T4, the controller 50 (FIG. 1) determines whether a contactor command should be generated. As shown, because the minimum cycle time is not reached, the contactor remains in the closed position.

At T4, the ignition transitions again from the ignition-off position to the ignition-on position. The contactor remains in the closed position and the timer is reinitiated. Again, between T4 and T5, the ignition transitions to the ignition-off position from the ignition-on position. However, the contactor remains in the closed position. At T5, the ignition transitions from the ignition-off position to the ignition-on position and the timer is reinitiated. At T6, the timer expires (i.e., the cycle time has been reached). At T7, subsequent to T6, the ignition transitions from the ignition-on position to the ignition-off position. Because the timer has expired, the controller 50 (FIG. 1) determines that the contactor command should be generated. Accordingly, the contactor command is generated in response to the positioning of the ignition without delay. As such, the contactor transitions from the closed position to the open position, thereby decoupling the vehicle battery from the high voltage bus.

Figure 3:
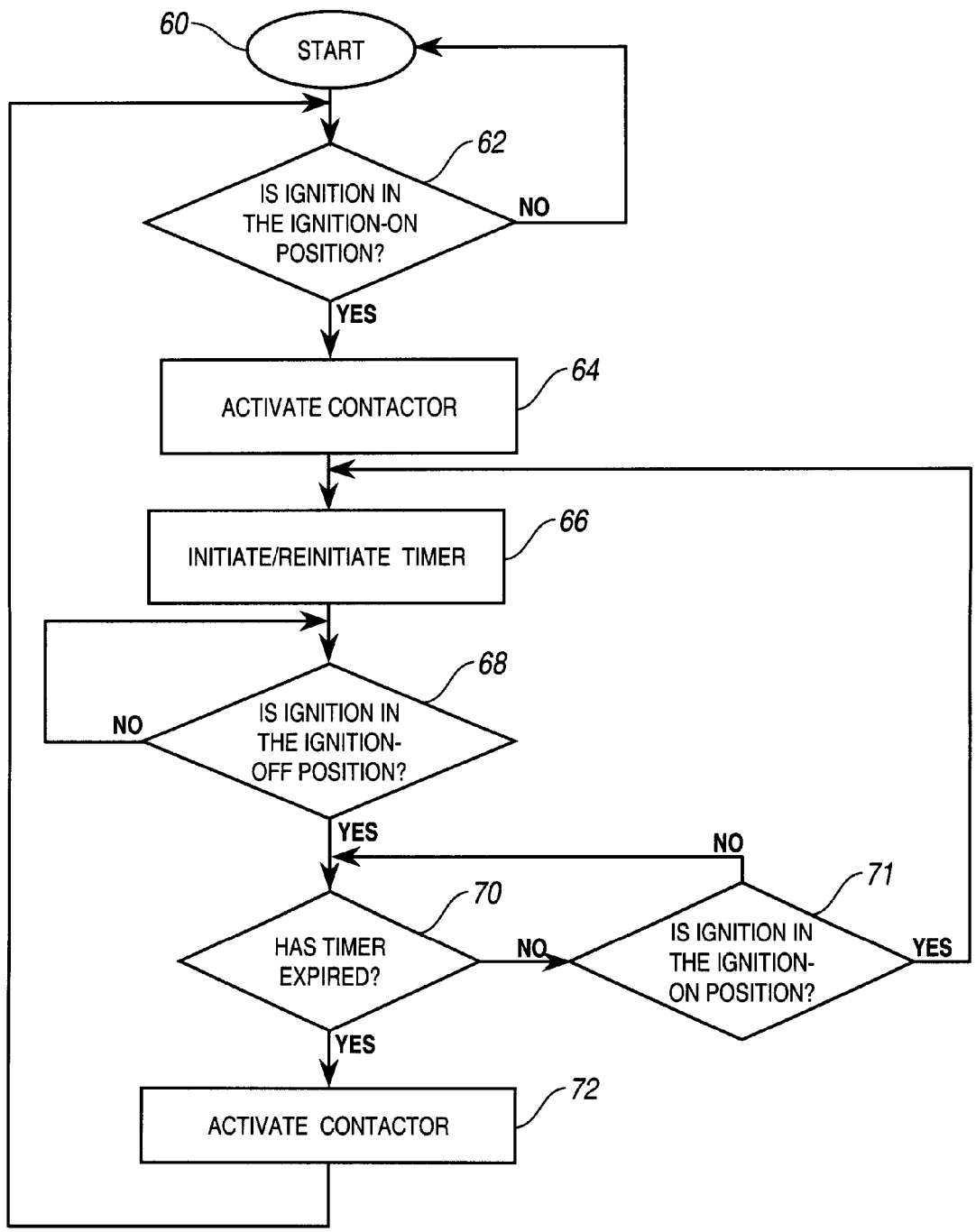
FIG. 3 is a flow chart of a method for controlling cycling of a vehicle contactor in accordance with an embodiment of the invention.

Now, referring to FIG. 3, a flow diagram provides a method for controlling cycling of a vehicle contactor in accordance with an embodiment of the present invention. A block 60 is the entry point into the method. As depicted by block 62, the method determines whether the ignition is placed in the ignition-on position. Accordingly, at block 62, in one embodiment, the controller generates a control signal for the BCM 54 (FIG. 1) to generate a first contactor command. If the ignition is not in the ignition-on position, the method returns to block 60. If the ignition is placed in the ignition-on position, the block 64 occurs. As depicted in block 64, the contactor is activated. In accordance with one embodiment, activation of the contactor includes the BCM 54 (FIG. 1) generating the first contactor command thereby causing the contactor to be in the closed position. At block 66, the timer, being set to expire once a predetermined cycle time is reached, is initiated. It is recognized that in some embodiments the blocks 64 and 66 may occur simultaneously.

At block 68, it is determined whether the ignition is in the ignition-off position. If the ignition has not transitioned to the ignition-off position, the method returns to block 68. If the ignition is placed in the ignition-off position, the block 70 occurs. Accordingly, at block 70, the controller 50 (FIG. 1) determines whether the timer has expired (or the cycle time has passed). The controller 50 also determines, based on the timer, whether a contactor command should be generated that would cause activation of the contactor. If the timer has expired, a block 72 occurs, wherein the contactor is activated. If the timer has not expired, a block 71 occurs. At block 71, the method determines whether the ignition is again in the ignition-on position. If so, the method returns to block 66 where the timer is reinitiated. If the ignition is not returned to the ignition-on position, the method returns to block 70.

As stated above, at block 70, the block 72 occurs when the timer expires. In one aspect, activation of the contactor at block 72 includes the BCM 54 generating a signal that causes the contactor to transition from the closed state to the open state. Following block 72, the method returns to block 62.

While the best mode for carrying out the invention has been described in detail, those familiar with the art to which this invention relates will recognize various alternative designs and embodiments for practicing the invention as defined by the following claims.

What is claimed:

1. A method of controlling cycling of a high voltage contactor that is connected to a high voltage bus on a vehicle, the method comprising:

generating a first contactor command based at least in part upon the positioning of a switch;

activating the contactor in response to the first contactor command being generated;

initiating a timer when the first contactor command has been generated, wherein the timer is set to expire once a predetermined cycle time has been reached;

prior to the timer expiring, determining whether a second contactor command should be generated subsequent to the generation of the first contactor command based at least in part upon the positioning of the switch;

upon determining that the second contactor command should be generated, generating the second contactor command when the timer expires; and activating the contactor in response to the second contactor command.

2. The method of claim 1, further comprising:

generating the first contactor command subsequent to the second contactor command; and reinitiating the timer when the first contactor command has been generated subsequent to the second contactor command.

3. The method of claim 1, wherein activating the contactor in response to the first contactor command includes placing a high-voltage switch in a closed position, wherein the switch allows the flow of current from a high-voltage battery to at least one of a generator and a motor located on the vehicle when the switch is in the closed position.

4. The method of claim 3, wherein activating the contactor in response to the second contactor command includes placing a high-voltage switch in an open position, wherein the switch disables the flow of current from a high-voltage battery to a generator and a motor located on the vehicle.

5. The method of claim 1, wherein activating the contactor in response to the second contactor command being generated once the timer has expired includes delaying processing of the second contactor command until the timer has expired.

6. The method of claim 5, wherein delaying processing of the second contactor command includes delaying the generation of a control signal for a battery control module.

7. The method according to claim 6, wherein the control signal is generated by a controller that is located on the vehicle.

8. The method of claim 1, wherein the switch is a vehicle ignition switch;
wherein the first contactor command includes a first contactor command signal that is generated in response to the vehicle ignition switch being in a first position; and
wherein the second contactor command includes a second contactor command signal that is generated in response to the vehicle ignition switch being in a second position.

9. The method of claim 8, wherein the first position includes an ignition-on position and the second position includes an ignition-off position.

10. A system for controlling the cycling of a high voltage contactor that is connected to a high voltage bus on a vehicle, the system comprising:
a battery control module (BCM) configured to generate a first contactor command for the contactor, wherein the contactor is activated in response to the first contactor command;
a controller having a timer that is initiated when the first contactor command has been generated, wherein the timer is set to expire once a predetermined cycle time has been reached, the controller, prior to the timer expiring, determining whether a second contactor command should be generated subsequent to the generation of the first contactor command based at least in part upon the position of a vehicle ignition switch; and
wherein upon determining that the second contactor command should be generated, the BCM generates the second contactor command upon the expiration of the timer, thereby activating the contactor in response to the second contactor command.

11. The system of claim 10, wherein the BCM is configured to generate the first contactor command subsequent to the second contactor command; and
wherein the controller initiates the timer when the first contactor command has been generated subsequent to the second contactor command.

12. The system of claim 10, wherein the contactor is activated in response to the first contactor command includes a high-voltage switch being placed in a closed position, wherein the switch allows the flow of current from a high-voltage battery to at least one of a generator and a motor located on the vehicle when the switch is in the closed position.

13. The system of claim 12, wherein the system being configured to activate the contactor in response to the second contactor command includes the high-voltage switch being placed in an open position, wherein the switch disables the flow of current from a high-voltage battery to a generator and/or a motor located on the vehicle when the switch is in the open position.

14. The system of claim 10, wherein the BCM generates the second contactor command upon the expiration of the timer includes the BCM delaying processing of the second contactor command until the timer has expired.

15. The system of claim 14, wherein delaying processing of the second contactor command includes delaying the generation of a control signal for the BCM located on the vehicle.

16. The system according to claim 15, wherein the control signal is generated by a controller in response to the position of the vehicle ignition switch that communicates with the controller.

17. The system of claim 10, wherein the first contactor command includes a first contactor command signal that is generated in response to the vehicle ignition switch being in a first position; and
wherein the second contactor command includes a second contactor command signal that is generated in response to the vehicle ignition switch being in a second position.

18. The system of claim 17, wherein the first position includes an ignition-on position and the second position includes an ignition-off position.

19. A method of controlling cycling of a high voltage contactor that is configured to couple a high voltage battery to a generator and a motor over a high voltage bus, wherein the contactor, the generator, the motor and the high voltage bus are located on a hybrid electric vehicle (HEV), the method comprising:
generating a first contactor command in response to placement of a vehicle ignition in an ignition-on position;
closing the contactor in response to the first contactor command being generated to couple the high voltage battery to the generator and the motor over the high voltage bus;
initiating a timer when the first contactor command has been generated, wherein the timer is set to expire once a predetermined cycle time has been reached;
determining, based on the timer, whether a second contactor command should be generated subsequent to the generation of the first contactor command in response to placement of a vehicle ignition in an ignition-off position;
opening the contactor in response to the second contactor command being generated when the timer has expired to de-couple the high voltage battery from the generator and the motor;
generating the first contactor command subsequent to the second contactor command in response to a second placement of the vehicle ignition in the ignition-on position;
closing the contactor in response to the first contactor command being generated subsequent to the second contactor command being generated to couple the high voltage battery to the generator and the motor over the high voltage bus; and
initiating the timer when the first contactor command has been generated subsequent to the second contactor command.

20. The method of claim 19, wherein opening the contactor in response to the second contactor command being generated once the timer has expired includes delaying processing of the second contactor command until the timer has expired.

* * * * *